(12) United States Patent
Entwistle

(10) Patent No.: US 6,666,231 B2
(45) Date of Patent: *Dec. 23, 2003

(54) SOLENOID VALVE

(75) Inventor: Richard Thomas Entwistle, Sydals (DK)

(73) Assignee: Danfoss A/S, Nordborg (DK)

( * ) Notice: Subject to any disclaimer, the term of this patent is extended or adjusted under 35 U.S.C. 154(b) by 47 days.

This patent is subject to a terminal disclaimer.

(21) Appl. No.: 10/028,607

(22) Filed: Dec. 19, 2001

(65) Prior Publication Data
US 2002/0079007 A1 Jun. 27, 2002

(30) Foreign Application Priority Data
Dec. 21, 2000 (DE) .......................... 100 64 349

(51) Int. Cl.[7] .................. F15B 13/044; F16K 31/02
(52) U.S. Cl. .............. 137/625.65; 251/52; 251/129.14; 251/129.19
(58) Field of Search ............. 137/625.65; 251/52, 251/129.14, 129.19

(56) References Cited
U.S. PATENT DOCUMENTS 4,027,850 A * 6/1977 Allen .................... 251/129.19
4,392,634 A * 7/1983 Kita ...................... 251/129.19
4,531,708 A * 7/1985 Livet ........................ 251/48
5,167,442 A * 12/1992 Alaze et al. ........... 251/129.19

* cited by examiner

Primary Examiner—Gerald A. Michalsky
(74) Attorney, Agent, or Firm—McCormick, Paulding & Huber LLP

(57) ABSTRACT

The invention relates to a solenoid valve with an inlet connection and an outlet connection, having between them a blocking device with a valve seat, a closure member and an armature, which influences a position of the closure member in relation to the valve seat. It is endeavoured to make a valve with a simple embodiment and little wear. For this purpose, it is ensured that the armature is arranged in a housing, dividing it into two chambers, and that the armature has a movement stroke with several sections, one first section being in the form of an idle stroke, during which a connection between the two chambers is open and the position of the closure member in relation to the valve seat does not change, and a second section being in the form of an effective stroke, during which the connection between the two chambers is closed and the armature causes or permits a movement of the closure member.

11 Claims, 2 Drawing Sheets

SOLENOID VALVE

FIELD OF THE INVENTION

The invention relates to a solenoid valve with an inlet connection and an outlet connection, having between them a blocking device with a valve seat, a closure member and an armature, which influences a position of the closure member in relation to the valve seat.

BACKGROUND OF THE INVENTION

A solenoid valve of this kind is known from, for example, DE 34 30 724 A1. When a coil is supplied with current, a magnetic field is generated, and the armature moves. The closure member, which is arranged on the armature, is lifted from the valve seat by this movement. When the magnetic field disappears, the armature is moved back under the force of a spring, so that the closure member comes to rest against the valve seat again. For this purpose, the closure member has a predetermined embodiment, which is in certain ways resilient, so that a damping is obtained, when the closure member strikes the valve seat.

DE 44 04 740 A1 describes another solenoid valve with an armature, which is displaceable against an end stop. Between the armature and the end stop damping means in the shape of a compressible ring are arranged.

DE 197 39 007 A1 shows a solenoid valve with a hydraulic damping, the hydraulic damping being arranged in an iron core and having a tappet extending from the iron core, a damping piston being arranged on the tappet.

In all cases, the damping of the movement of the armature requires additional parts and component groups, which make the embodiment of the valve complicated.

The general object of the present invention is to minimise wear.

SUMMARY OF THE INVENTION

In a solenoid valve as mentioned in the introduction, this task is solved in that the armature is arranged in a housing, dividing it into two chambers, and that the armature has a movement stroke with several sections, one first section being in the form of an idle stroke, during which a connection between the two chambers is open and the position of the closure member in relation to the valve seat does not change, and a second section being in the form of an effective stroke, during which the connection between the two chambers is closed and the armature causes or permits a movement of the closure member.

Thus, a certain damping is obtained through the movement of the armature. In a solenoid valve, which is suited for controlling a fluid, for example, a solenoid valve for a humidification system, certain leakages always exist, which cause the housing to be filled with fluid. When the armature moves, it displaces the fluid from one chamber of the housing into the other chamber. This is possible, because the connection between the two chambers is open during the idle stroke. At the end of the idle stroke, that is, at the beginning of the effective stroke, however, the connection is closed. In one of the chambers, fluid reserves have then been created, which are basically not compressible. An additional movement of the armature is thus only possible to the extent, to which leakages exist. Thus, the term "closed" does not indicate a hermetically sealed closing. On the contrary, within the range of the leakages mentioned, a certain fluid penetration is still possible. However, this fluid penetration is throttled in such a way that a movement of the armature during an effective stroke is only possible against a certain resistance. This resistance causes a damping of the movement of the armature, so that the armature reaches an end stop or acts upon the closure member only with a reduced speed. Through this damping, the wear is kept small. The armature can act directly upon the closure member. However, it can also act indirectly, for example in that the armature, or a part being connected with the armature, is lifted from the closure member, thus permitting a movement, which had until then been blocked.

Preferably, the closure member has a tappet, which acts upon a separate closure element, the effective stroke being larger than the maximum opening movement of the closure element and the pressure in one of the two chambers acting upon the end of the tappet turning away from the closure element. With this embodiment, it is achieved that due to the pressure in the chamber, the tappet always bears on the closure element. This means that the tappet can no longer strike the closure element abruptly, which could cause an increased wear or even a damage to the tip of the tappet or of the closure element. When the closure element is separated from the tappet, that is, both are made as independent parts, there is an increased freedom with regard to the selection of materials for both elements.

Preferably, a closing force device acts upon the closure element in the direction of the valve seat, and the armature acts against the closing force device. In the simplest case, the closing force device is made as a closing spring, which presses the closure element against the valve seat, if required; a tappet is inserted between them. The armature now reduces the force, with which the closure member is pressed against the valve seat. When the force gets smaller than force generated by the pressure of the fluid, which acts upon the closure member by way of the valve seat, the closure member is lifted from the valve seat and the valve opens. This means that the valve is closed when de-energized. In such a valve the closing movement appears through the force of the closing force device. However, this force can only act upon the closure element in a damped manner, as the closing requires a movement of the armature, which is damped by the fluid trapped in the chamber facing the closure element.

Preferably, the armature closes the connection. Thus, additional control elements are not required. The closing and the opening of the connections between the two chambers appear in the course of the movement of the armature at the correct instants.

It is particularly preferred that, the armature has a channel extending in the movement direction and having a narrow passage, which comes to rest on a movably supported sealing face at the end of the first section. The narrow passage, which has, for example, a circumferential shoulder, forms, together with the sealing face, the combination, which leads to a closing of the connection between the two chambers in the housing. Thus, the closing of the connection can be effected by a simple displacement of the armature.

Preferably, the sealing face acts upon the tappet. Thus, it is ensured that the effect on the tappet appears at the same time as the closing of the connection between the two chambers. This means that the armature is lifted from tappet at the time, when the connection is closed, or it strikes the tappet, when the connection is opened.

Preferably, it is ensured that, when the valve is open, the closure element closes an auxiliary valve seat, which is connected with a tank connection. This embodiment is particularly advantageous in connection with a humidification system, as this embodiment prevents orifices of the humidification system from dripping, when the valve is closed. When the valve is closed, the outlet connection is connected with the tank connection, to permit remaining fluid to flow off.

Preferably, the closure element is supported in a guiding device. The guiding device ensures that during a movement the closure element cannot be laterally displaced, but is always guided straight to the valve seat or to the auxiliary valve seat. Thus, the function of the valve is also guaranteed with a high degree of safety, even when the closure element and the tappet are made as two separate parts.

It is particularly preferred that the guiding device has an opening, in which the closure element is arranged, the diameter of the opening being equal to that of the closure element plus a predetermined play. There is nothing preventing a generous dimensioning of the play. At any rate, it must be so large that the closure element can move undisturbed in the opening of the guiding device. On the other hand, with this embodiment, the guiding device has an additional task, particularly when the valve is open and the closure element has to close the auxiliary valve seat. In this connection, the guiding device also serves the purpose of preventing, or at least hampering, a short-circuit between the valve seat and the auxiliary valve seat, during the whole movement of the closure element. Among other things, this is caused by the closure element practically filling the opening in the guiding device, so that a direct fluid flow between the valve seat and the auxiliary valve seat is only possible to a very limited extent.

It is preferred that the guiding device has a guiding member in the shape of a bowl opening in the direction of the valve seat. When, during its movement, the closure element closes the opening in the guiding device, the fluid flowing through the valve seat is led away by the auxiliary valve seat through the guiding member, that is, in a manner of speaking flows a little backward on the outside of the valve seat. As the time, during which the closure element moves from the valve seat to the auxiliary valve seat or vice versa, is relatively short, this diversion of the incoming fluid is sufficient to prevent the short-circuit.

Preferably, the valve has a nominal flow rate of 1 to 5 l/min. A nominal flow rate of this size is sufficient for humidification systems. With the valve described, this is easily controlled.

BRIEF DESCRIPTION OF THE DRAWINGS

In the following, the invention is described on the basis of a preferred embodiment in connection with the drawings, showing.

DETAILED DESCRIPTION OF THE PREFERRED EMBODIMENTS

Figure 1:
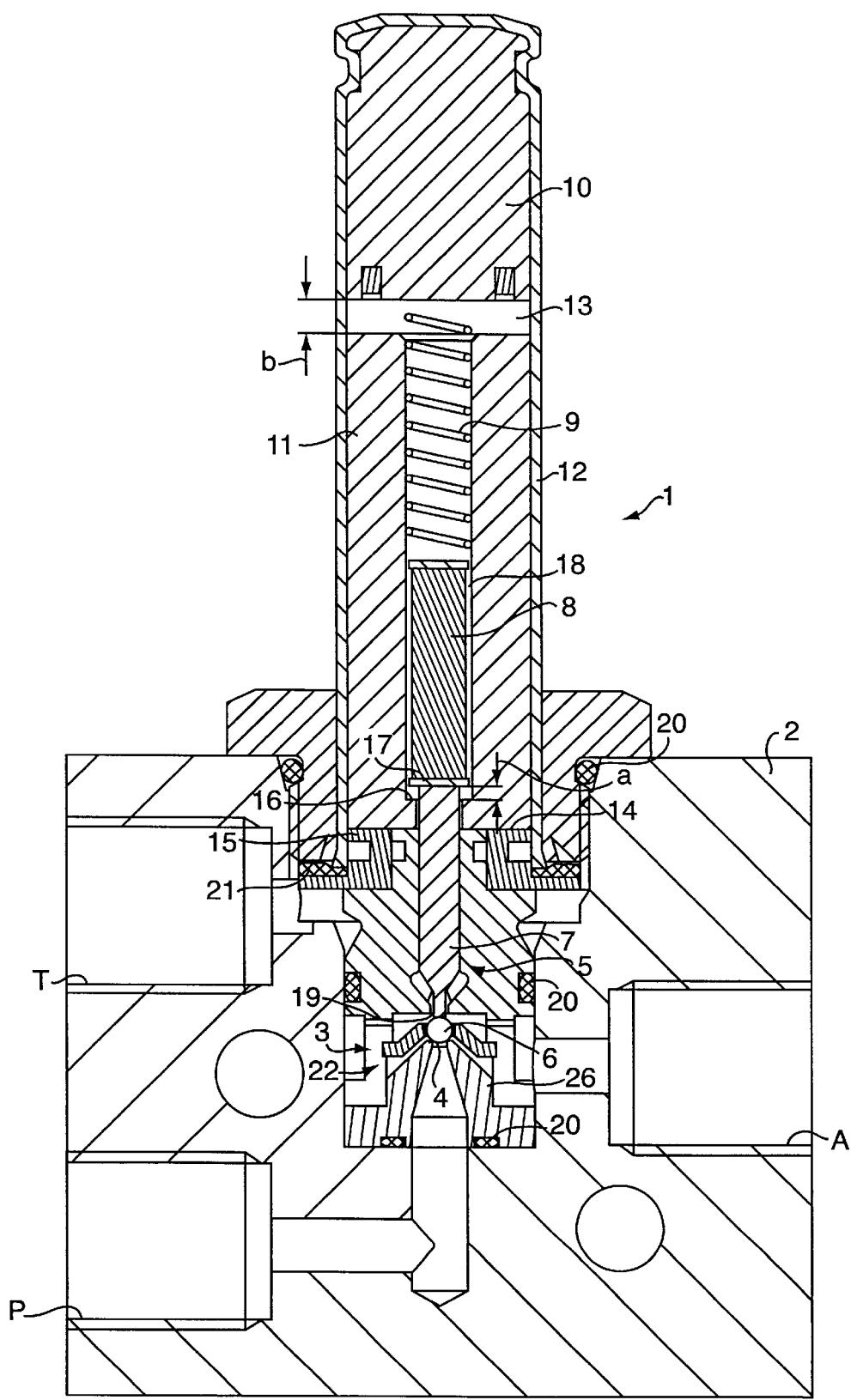
FIG. 1 is a cross-sectional front elevational view of a valve embodying the present invention.

A valve generally designated by the reference number 1 has a housing 2 with an inlet connection P and an outlet connection A. Between the inlet connection P and the outlet connection A is arranged a blocking device generally designated by the reference number 3, which has a valve seat 4 and a closure member 5. The closure member 5 has a closure element 6 in the shape of a ball, the ball having a diameter in the range between 1 and 4 mm, in the present case approximately 2 mm, however, the present invention is not limited in this regard. In the closed position shown in FIG. 1, the closure element 6 is pressed against the valve seat 4 by a tappet 7. Via an intermediary member 8, the tappet 7 is loaded by a pressure spring 9, which is supported by an electromagnet 10, which is part of the drive for the tappet 7. Further, the electromagnetic drive comprises an armature 11, which is movable in a housing 12 against the force of the spring 9. The armature 11 divides the interior of the housing into two chambers 13, 14, chamber 14 not being visible, because the armature 11 bears on a bottom seal 15. When the armature 11 is lifted, the chamber 14 is formed between the armature 11 and the bottom seal 15. The electromagnet 10 can also be arranged elsewhere. For example, magnetic coils can surround the housing 12. In this case, the pressure spring 9 would be supported on an end stop.

When the electromagnet 10 is acted upon with current, the armature 11 is moved upward, until a shoulder 16 defined by the armature comes to rest against a sealing ring 17, which is arranged on the bottom side of the intermediary member 8. Initially, the armature 11 does an idle stroke illustrated in FIG. 1 by the letter "a". During this idle stroke a, fluid that fills the housing 12 can escape through a gap 18 that is formed between the armature 11 and the intermediary member 8 from the chamber 13 into the chamber 14 to build up a fluid cushion. Before coming to rest against the electromagnet 10, the armature 11 can travel a distance b that is longer than the idle stroke a. The difference (b−a) is then an effective stroke. During this effective stroke, the sealing ring 17 bears on the shoulder 16 of the armature 11 and blocks the passage from chamber 13 to chamber 14. This does not mean that the connection between the two chambers 13, 14 is completely interrupted. Small leakages will always remain, through which fluid can continue to flow from the chamber 13 into the chamber 14. However, this fluid flow is heavily throttled. When the intermediary member 8 has been lifted off from the tappet 7, the pressure in the inlet connection P causes the closure element 6 to be lifted off from the valve seat 4, as it is no more supported against this pressure. Thus, fluid can flow from the inlet connection P to the outlet connection A.

After a predetermined movement, which is shorter than the effective stroke b−a, the closure element 6 comes to rest against an auxiliary valve seat 19. In a manner not shown in detail, this auxiliary valve seat 19 is connected with a tank connection T. When the valve is closed, fluid remaining at the outlet connection A can flow off to the tank connection T, to prevent fluid from dropping from the closed valve.

The closing procedure of the valve occurs in the opposite order. When the electromagnet 10 is de-energised, the armature 11 moves under the influence of the pressure spring 9 to rest against the bottom seal 15. During the effective stroke, the sealing ring 17 bears on the shoulder 16 of the armature, so that the connection between the two chambers 13, 14 is interrupted, when not considering small leakages. The return movement of the armature 11 to the starting position shown in FIG. 1 thus occurs with a strong damping and an accordingly reduced speed, so that a load on the closure element 6 is kept small. Additionally, with retracted armature 11, the pressure in the chamber 14 is available on the front side of the tappet 7, which cooperates with the sealing ring 17. Thus, the tappet 7 is always kept in bearing with the closure element 6. Also during the closing movement, it cannot happen that the tappet 7 hits the closure element with a high speed. The gap 18 also extends into the area of the narrow spot, which is formed between the shoulder 16 and the lower end of the armature 11.

Schematically shown are several seals 20, 21, with which the housing 12 is sealed in relation to the housing 2. Further, particularly the sealing 21 can adopt certain tolerances.

Figure 2:
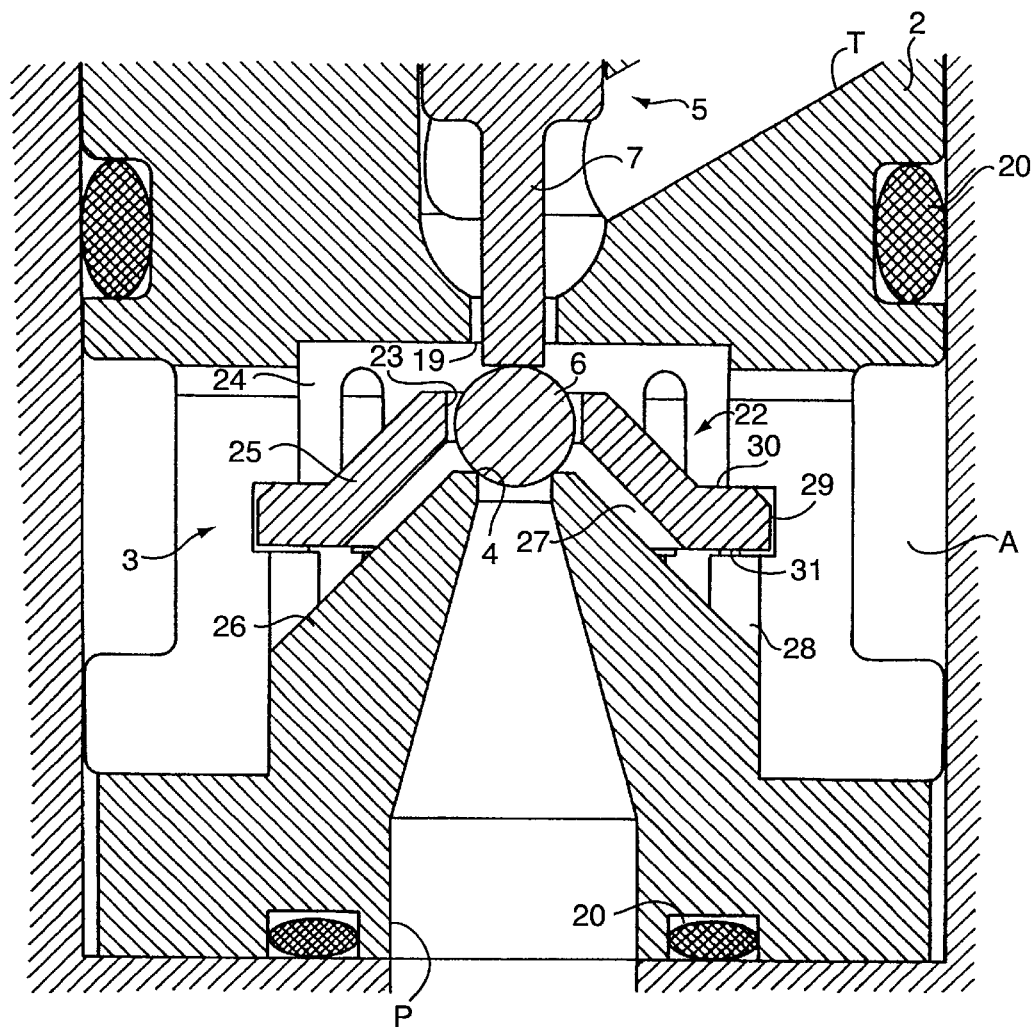
FIG. 2 is an enlarged cross-sectional view of the valve according to FIG. 1

To ensure that the closure element 6 always reaches the valve seat 4 or the auxiliary valve seat 19, respectively, a guiding device 22 is provided, which is shown in detail in FIG. 2. The guiding device 22 has an opening 23, whose diameter is slightly larger than the diameter of the closure element 6. In other words, the diameter of the opening 23 corresponds to that of the closure element 6 plus a predetermined play. When the closure element 6 is lifted off from the valve seat 4, the direct path from the valve seat 4 to the auxiliary valve seat 19 is blocked, because the closure element 6 almost fills the opening 23. Accordingly, during the movement of the closure element 6, only a very small share of the fluid can flow into the tank connection T.

The guiding device 22, which is arranged in a retaining part 24, and thus retained in the housing 2, has a guiding member 25 in the shape of a bowl, which opens in the direction of the valve seat 4. The valve seat 4 is arranged on the top of a pipe member 26, which has a conical outside. Accordingly, a gap 27 is formed between the pipe member 26 and the guiding member 25, which gap 27 has a substantially constant thickness over a certain distance in the radial direction. On the radial end, the gap 27 has an expansion zone 28. Above the expansion zone 28, the guiding member 25 has a flange 29, with which the guiding device 22 is retained in the retaining part 24. For this purpose, the flange 29 has retaining surfaces 30, 31, which are perpendicular to the pressure direction, which is defined by the fluid in the inlet connection P.

The guiding device 22 with the guiding member forms a deflector, which improves the opening behaviour of the closure element 6. The guiding member 25 forms a separation between a high-pressure area, which is arranged between the pipe member 26 and the guiding member 25, and a low-pressure area on the other side of the guiding member 25. In a manner of speaking, the low pressure acts upon the upper side of the closure element 6 and generates a pressure drop. Thus, forces appear on the closure element 6, which reliably cause that the closure element 6 can change its position from the valve seat 4 to the auxiliary valve seat 19. This makes up for the fact that due to the small opening of the valve seat 4, only small forces can act upon the closure element 6 in the opening direction.

Both the guiding device 22 and the retaining part 24 are made of plastic, the material of the guiding device 22 having particularly been chosen in such a way that it cooperates with the material of the closure element 6 with only little friction. The use of a retaining part 24 makes the working of the housing 2 and the assembly relatively simple.

In the illustrated embodiment the closure element 6 is a commercially available steel ball with a diameter of approximately 2 mm, however, the present invention is not limited in this regard. The pressure drop over the valve is relatively small, so that the forces that act upon the ball will be accordingly small. Instead of a steel ball, balls made of other materials can of course also be used, for example plastic or ceramic balls.

The guiding device 22 has several tasks. The guiding device 22 guides the closure element 6 on the way from the valve seat 4 to the auxiliary valve seat 19 and back. It also causes a relatively strong throttling of a fluid flow from the valve seat 4 to the valve seat 19 during the period in which the closure element 6 bears on none of the valve seats 4, 19. The fluid that escapes from the valve seat 4, is first led through the gap 27 between the pipe member 26 and the guiding member 25, that is, it is prevented from flowing direct to the auxiliary valve seat 19.

The movement of the tappet 7 during closing of the valve is heavily damped. The first reason for this is that the tappet 7 always bears on the closure element 6, and the second reason is that the return movement of the armature 11 can only take place at a heavily damped speed.

What is claimed is:

1. A solenoid valve comprising:
   a first housing having an inlet and an outlet connection;
   a blocking device positioned within said first housing and including a valve seat, and a closure member movably positioned adjacent to said valve seat;
   a second housing coupled to said first housing and having an armature movably positioned therein so that the movement of said armature influences the position of said closure member relative to said valve seat;
   said armature and said second housing coacting to define a first chamber when said armature is in one position and a second chamber when said armature is in another position;
   said armature, movable along an overall stroke defined by a first section wherein the first and second chambers are in fluid communication with one another and the position of the closure member relative to the valve seat stationary, and a second section wherein the first and second chambers are not in fluid communication with one another and the closure member is movable relative to the valve seat.

2. A solenoid valve as defined by claim 1, wherein the closure member includes a tappet movably extending therethrough that engages a closure element positioned between an end of said tappet and said valve seat, and wherein the effective stroke is larger than the maximum movement of the closure element and the pressure in one of the first and second chambers acting upon said end of said tappet turning away from said closure element.

3. A solenoid valve as defined by claim 2, further comprising a closing force device positioned in said second housing for urging said closure element toward said valve seat, and wherein said armature acts against said closing force device.

4. A solenoid valve as defined by claim 1, wherein said armature is adapted to close the connection between said first and second chambers.

5. A solenoid valve as defined by claim 4, wherein the armature defines a channel extending longitudinally therethrough said channel having a narrow passage adapted to come to engage a movably supported sealing face located at the end of the first section.

6. A solenoid valve as defined by claim 5, wherein said sealing face acts upon said tappet.

7. A solenoid valve as defined by claim 2, wherein said closure element closes an auxiliary valve seat, connected with a tank connection, when the valve is open.

8. A solenoid valve as defined by claim 1, wherein said closure element is supported in a guiding device that is positioned in said first housing.

9. A solenoid valve according to claim 8, wherein said guiding device defines an opening, in which said closure element is arranged, the diameter defined by the opening being approximately equal to that of a diameter defined by said closure element plus a predetermined amount of play.

10. A solenoid valve as defined by claim 9, wherein said guiding device includes a guiding member in the shape of a bowl opening in the direction of said valve seat.

11. A solenoid valve as defined by claim 1, wherein said valve has a nominal flow rate of 1 to 5 l/mm.

* * * * *

UNITED STATES PATENT AND TRADEMARK OFFICE
CERTIFICATE OF CORRECTION

PATENT NO.    : 6,666,231 B2                                       Page 1 of 1
DATED         : December 23, 2003
INVENTOR(S)   : Richard Thomas Entwistle It is certified that error appears in the above-identified patent and that said Letters Patent is hereby corrected as shown below:

Column 6,
Line 15, please insert -- being -- after "armature,"
Line 18, please insert -- is -- after "seat".
Line 59, please replace "51/mm" with -- 51/min --.

Signed and Sealed this

Sixth Day of April, 2004

JON W. DUDAS
*Acting Director of the United States Patent and Trademark Office*